Jan. 18, 1966 P. M. HUNT 3,230,316

TELEPHONE ISOLATION APPARATUS

Filed Feb. 12, 1963

INVENTOR

Philip M. Hunt

BY Mason, Fenwick & Lawrence

ATTORNEYS

United States Patent Office
3,230,316
Patented Jan. 18, 1966

3,230,316

TELEPHONE ISOLATION APPARATUS

Philip M. Hunt, Fairfax County, Va., assignor to Orbit Industries, Incorporated, Vienna, Va., a corporation of Virginia

Filed Feb. 12, 1963, Ser. No. 258,025
6 Claims. (Cl. 179—84)

The present invention relates to isolation devices for telephone ringing circuits of telephone lines and the like.

In the past it has been recognized that divided circuit ringers, as a specific example but not the only example, upset the electrical balance of telephone pairs. In those instances where there is power-line induction, the above unbalance results in metallic circuit noise due to a potential difference between the two conductors. Assume, for example, an elementary form of power-line coupling to a telephone pair wherein there is capacitive coupling between the ring side and the power line and between the tip side and the power line. This is a greatly simplified indication of the actual exposure, since each telephone conductor also has coupling to the ground, the other conductor, overhead messenger and other conductors. These factors affect but do not eliminate the general capacitive coupling or exposure in the assumed example. If a single telephone line transposition is provided in this example, it is apparent that an accurate transposition will cause equal exposure currents to be coupled into each conductor of the telephone line thus securing cancellation on a metallic-pair basis. In a common telephone ringing system of the full selective type, a number of up to five subscribers may be connected between each side of the telephone line and ground. Other schemes of applying ringers on this "divided" basis are also in common use. In this example, assume only two such divided ringers, $Z_1$ and $Z_2$ as illustrative of a typical ringing system, with $Z_1$ connected between the ring side of the pair and ground and $Z_2$ is connected between the tip side of the pair and ground. If the impedances of $Z_1$ and $Z_2$ are the same and these two ringers are symmetrically connected to the line, as for example in subscriber homes across the street from each other, then the initial balance achieved by transpositions will be maintained and no metallic circuit noise or induction voltages will result. However, in practical installations, the impedances of the ringers are somewhat dissimilar and their point of attachment different.

Efforts to restore current balance by insertion of dummy ringers has not been completely satisfactory and cost considerations related to first cost, installation and maintenance make this a costly solution as well as an unsatisfactory one.

More recently, a circuit isolation device in the nature of a rare gas relay tube has been inserted in each ringer ground return lead. This device passed the normal ringing currents but provided infinite circuit isolation until the gas tube conduction was initiated. Shortcomings of this solution include high first cost, short life and tendency to ionize frequently on high level peak transients present on the telephone line. The net result of these transient discharges is to materially shorten the gas tube life as well as to produce noise during such discharges.

The various types of ringer isolation devices now proposed or in use such as vacuum or rare gas tubes and relays are characterized by one or more of the following shortcomings. The application of rare gas tubes or relays, while effective in restoring line balance, imposes a ringing current transmission loss due to the internal resistance of the isolation device. Certain of the prior isolation devices are polarity conscious and therefore do not result in the universal applicability which is achieved in the present device. A most common problem in connection with rare gas isolation devices is their relatively short service life. This is attributed to the incidence of lightning surges which cause high peak currents carried by the gas tube and are destructive and materially shorten the tube life or in some instances destroy it in a single discharge.

An object of the present invention, therefore, is the provision of a novel telephone ringer isolation device which is not subject to the above-mentioned disadvantages.

Another object of the present invention is the provision of a novel telephone ringer isolation device which has universal applicability for circuits as commonly encountered in telephony wherein various combinations of ringing voltages, frequencies, and polarities with and without superimposed battery, may be employed.

Another object of the present invention is the provision of a novel telephone ringer isolation device employing a gas discharge tube operating at a low current to close a metallic circuit through relay contacts, wherein there is no impairment of the ringing circuit as seen from the telephone ringer.

Other objects, advantages, and capabilities of the present invention will become apparent from the following detail description, taken in conjunction with the accompanying drawing illustrating preferred embodiments of the invention.

The invention, in general, involves the provision of a circuit which will accommodate a very sensitive magnetic reed relay by limited current conduction to complete a telephone ringing circuit through a ringer, but, which normally isolates the ringer from the telephone line. A neon tube or similar device having a break down voltage of about 65 volts is connected between the telephone line and a magnetic reed relay coupled to ground. In an alternate form, the reed relay is arranged in a diode bridge circuit having a solenoid and a shunt storage capacitor between the mid points of the two branches of the bridge for actuating reed relay contacts magnetically coupled with the solenoid. When ringing pulses of either polarity are applied to reed relay or the bridge rectifier, the reed relay is activated to complete the circuit from the telephone ringer to ground and permit the ringer to be operated. During non-occurrence of ringing pulses, the reed relay contacts are open, thereby completely isolating the telephone ringer from the telephone line so that the telephone ringer does not upset the electrical balance of the telephone line.

Figure 1:
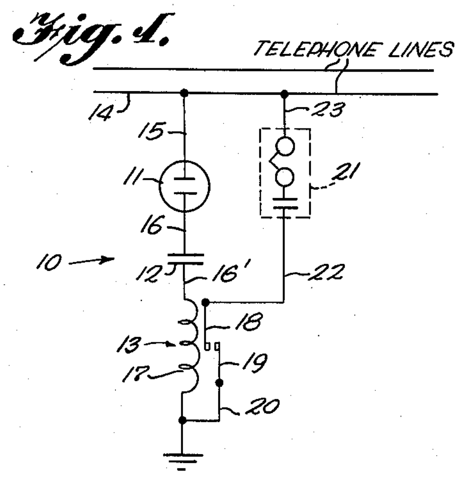
FIGURE 1 is a schematic diagram of one form of telephone ringer isolation circuit embodying my invention.

Referring to the drawing, and specifically to the illustration in FIGURE 1 of an exemplary telephone ringer isolation circuit embodying my invention, the isolation circuit, indicated generally by the reference character 10 includes a gas discharge tube 11, a capacitor 12 and a magnetic reed relay unit 13 connected in series relation between the telephone line 14 and ground or a ground connection. The gas discharge tube 11 may be of the neon type having a break down voltage of 65 volts, and is preferably of the type employing radioactive gas, one practical example being a 1/10 watt miniature neon tube. One element of the gas discharge tube 11 is connected directly by the lead 15 to the telephone line 14 and the other element of the tube 11 is connected by the lead 16 to capacitor 12, which in turn is connected by lead 16′ to the solenoid or coil 17 of the reed relay unit. Contacts 18, 19 of the magnetic reed relay 13 are connected to ground through lead 20 and to one terminal of a telephone ringer 21 through lead 22, the opposite terminal of the telephone ringer 21 being connected through lead 23 to the telephone line 14 or the lead 15 to the gas discharge tube 11.

Figure 4:
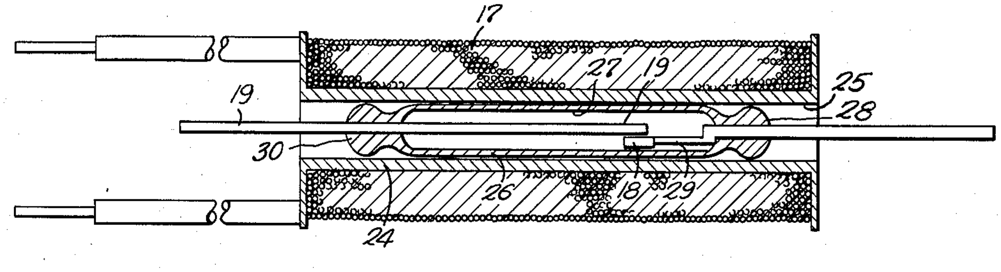
FIGURE 4 is a section view of a reed relay unit which may be used in the ringer isolation circuit.

The details of construction of one exemplary form of reed relay unit 13 which may be advantageously used in the present telephone ringer isolation circuit is illustrated in FIGURE 4, and comprises a hollow cylindrical winding or solenoid 17 formed about a spool 24 having an axial bore 25 therein. Within the bore 25 is a capsule type housing 26 having internal chamber 27 therein, one end portion 28 of the housing 26 fixedly supporting a thin, elongated vibratory reed 29 having exterior end portions for electrical connection to the reed and an interior end portion which forms the contact 18 of the reed relay unit. The opposite end 30 of the housing 26 supports the stationary contact member 19 having an exterior portion for electrical connection to the reed relay unit and an interior end portion which is normally spaced from the contact portion 18 of the vibratory reed 29, but, which intermittently contacts the contact member 18 when pulses or currents of suitable frequency pass through the winding 17.

The vibratory reed 29 has very little mass and a natural mechanical resonance period above 1 kc. In one specific example, the solenoid coil 17 may have about 30,000 ohms D.C. resistance and a nominal inductance of about 4.5 henries which may vary substantially, reaching values of greater than 5 henries, when the magnetic reed relay is placed in the flux field.

The technical criteria for selection of the above values are that the impedance of the device as connected in the telephone circuit be equivalent to or higher than that of conventional telephone instrument ringers in order that the ringing current demands may be at a minimum. Additionally, the electro-mechanical resonant frequency of the isolation device should fall in or near the frequency range of 16 to 66 c.p.s. in order that the device exhibit series resonance at any ringing frequency and thus accept power to actuate the enclosed reed switch.

The neon tube rating is determined by peak and average current which must be conducted to actuate the relay. The neon current and voltage ratings act as limiting factors in the design of the solenoid. The solenoid design must additionally provide an effective flux path for the axially located magnetic switch and in general this dictates an overall length of the solenoid comparable with the length of the magnetic elements of the reed switch. The circuit values are chosen so the solenoid relay will have board electro-mechanical resonance in the frequency range of 16 to 66 c.p.s. and so that the device introduces a finite delay in circuit closure and high impedance to incident surge voltages with high frequency components, such as typical lightning induced surges.

In the operation of the isolation device, application of a ringing voltage in excess of about 65 volts (neon break down) causes a small current, normally less than 2 ma., to flow in the circuit, i.e. through the solenoid 17. The flux resulting from this current passes through the magnetic materials incorporated in the reed relay members since the reed relay is axially positioned within the solenoid 17.

Figure 2:
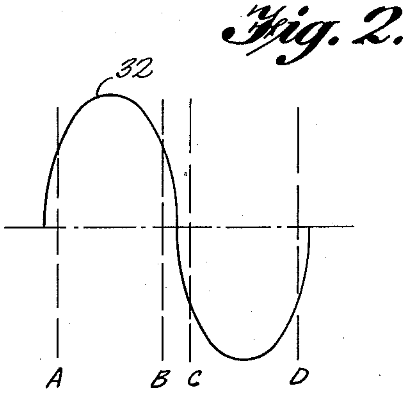
FIGURE 2 is a diagrammatic waveform of ringing voltage illustrating the portions of a cycle over which ignition of the gas tube occurs.

While the L.C. circuit formed by the inductance of the solenoid 17 and the capacitor 12 is resonant at approximately 20 c.p.s., the device is responsive over the usual range of ringing frequencies of 16 to 66 c.p.s. Referring to the waveform of FIGURE 2 wherein reference character 32 denotes the alternating current ringing voltage, the reed is pulled in, closing the contacts 18, 19, over the range A–B and the range C–D, denoting the approximate ignition ranges of the neon gas discharge tube 11 for the positive and negative half cycles respectively. The contacts 18, 19 also hold in for the range B–C, between neon ignition ranges, probably due to residual magnetism. The reed relay has a delay time due to starting inertia, thus rendering the circuit non-responsive to short term non-repetitive transients to establish the ringing circuit.

With this circuit, the telephone ringer 21 is completely disconnected from the telephone line 14 by the reed relay contacts 18, 19 except during the ringing period. While shown in a configuration which removes the ground return, it is obvious that the reed relay contacts 18, 9 could equally well be placed in the line lead 23 with the ringer 21 permanently connected to ground.

This arrangement achieves complete isolation of the ringer with respect to line except during the ringing periods. This isolation is inherent in the gas tube when it is in a non-conducting state at which time it appears as an infinite impedance if the minimal interelectrode capacitance is neglected. The device is compatable with a number of telephone ringing systems, including those having a frequency range of at least 16–66 c.p.s., those wherein a ringing voltage plus superimposed D.C. battery of either polarity are used, and those having reverting call options. In the present arrangement the device is not polarity conscious and accepts ringing voltage only or ringing voltage plus battery of any polarity.

Figure 3:
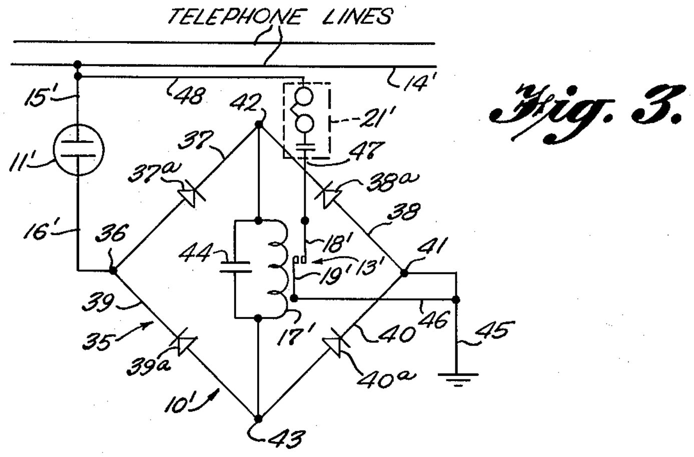
FIGURE 3 is a schematic diagram of another form of telephone ringer isolation circuit embodying my invention.

Referring to the alternate form of the present invention illustrated in FIGURE 3, wherein elements corresponding to those shown and described in the preceding embodiment are designated by primed reference characters corresponding to those used in connection with FIGURE 1, the modified isolation circuit 10′ includes a gas discharge tube 11′ and a bridge circuit 35 connected in series relation between the telephone line 14′ and ground. One element of the gas discharge tube 11′ is connected directly by the lead 15′ to the telephone line 14′ and the other element of the tube 11′ is connected by the lead 16′ to the end 36 of bridge circuit 35. The bridge circuit 35 includes two branches formed of legs 37, 38 and legs 39, 40 respectively, extending between the end 36 and an opposite end 41 of the bridge circuit, the legs 37 and 40 having similarly directed rectifier diodes 37*a* and 40*a* therein, and the legs 38 and 39 having similarly directed rectifier diodes 38*a* and 39*a* therein which conduct current in a direction opposite to the first-mentioned diodes 37*a* and 40*a*. Connected between the midpoints 42 and 43 of the two branches of the bridge circuit 35 is the solenoid or coil 17′ of a reed relay unit 13′ which is parallelled by a storage capacitor 44. The end 41 of the bridge circuit 35 is connected directly by lead 45 to ground or to a suitable ground connection. Contacts 18′ and 19′ of the reed relay unit 13′, which are schematically shown in FIGURE 3, are connected to ground through the lead 46 and to one terminal of a telephone ringer 21′ through lead 47, the opposite terminal of the telephone ringer 21′ being connected through lead 48 to the telephone line 14′ or the lead 15′.

The solenoid in this embodiment may be the same as that in the previously described embodiment and the capacitor 44 may have a rating of 1 microfarad.

In the operation of the isolation device, application of a ringing voltage in excess of about 65 volts (neon break down) causes a small current, normally less than 2 ma. to flow in the circuit, i.e. through the solenoid 17′. The flux resulting from this current passes through the magnetic materials incorporated in the reed relay members since the reed relay is axially positioned within the solenoid 17′.

The pulses of ringing current will follow one of two paths in the bridge rectifier 35 dependent upon the polarity of the pulses, either through the leg 37, solenoid 17′ and leg 40, or through leg 39, solenoid 17′ and leg 38. The net result is to produce a pulsating D.C. current through solenoid 17′. Shunt capacitor 44 acts as a storage element to keep the reed relay energized between pulses. This is necessary since the reed relay has very little mass and a period above 1 kc. and would normally tend to open the contacts between low frequency pulses such as are used in telephone ringing circuits, i.e. 16–66 c.p.s.

With this circuit, the telephone ringer 21' is completely disconnected from the telephone line 14' by the reed relay contacts except during the ringing period. While shown in a configuration which removes the ground return, it is obvious again that the reed relay contacts 18', 19' could equally well be placed in the line lead 48 with the ringer 21' permanently connected to ground.

These arrangements provide a ringer isolation device which has substantially universal applicability to the circuits commonly encountered in telephony, particularly with their many combinations of ringing voltages, frequencies, battery voltages or no superimposed battery, and polarities. Illustrative of the variety of conditions that may be encountered is a typical case of a reverting call on a party line where one side such as the TIP side of the line may have impressed upon it 100 volts of ringing voltage at 40 c.p.s. whereas the other or RING side may have impressed upon it a ringing voltage of 120 volts at 60 c.p.s. plus a negative battery voltage of 48 volts. Many combinations of ringing voltages, frequencies and battery voltage and polarity are commonly encountered and the present device is designed to operate on any and all combinations thereof.

The combination of circuit elements herein described has been found to eliminate or substantially minimize the possibility of tube failure or shortened life. Appropriate selection of the reactive and resistive circuit elements in series with the gas discharge tube substantially limits the rate-of-rise of incident surge voltages and hence the peak currents which will flow through the gas discharge tube.

While but two preferred examples of the present invention have been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. A telephone ringer isolation circuit for each subscriber ringer associated with respective tip and ring wires of a two-wire telephone line for use in multi-party telephone systems having varying combinations of ringing voltages and frequencies with and without direct current potentials of either polarity to preserve electric line balance between said wires during talking periods and responsive only to alternating current ringing voltages for activating any of a set of ringers associated with a respective one of said lines to connect said set of ringers to said one of said lines during occurrence of said ringing voltages in said circuit comprising a magnetic reed relay having a solenoid winding and magnetic switch having a pair of contacts including a contact on a vibratory reed responsive to magnetic field variations to produce closure of said contacts, a normally non-conducting two-electrode gas tube, a rectifier bridge circuit connected in series circuit with said gas tube between the one of said wires by which the associated ringer is activated and ground, said rectifier bridge circuit having a plurality of unidirectional conductive means interconnected with said solenoid winding to cause pulsating direct current components of alternating currents applied to said bridge to flow in a single selected direction through said winding, a shunt capacitor across said winding, said contacts being responsive to magnetic flux generated by said winding to close upon application of said ringing voltages across said gas tube and bridge circuit, and means connecting the associated ringer in series circuit with said contacts and said one wire and ground said gas tube responding to said ringing voltages on the associated one of said wires to conduct current therefrom through said bridge circuit and coil for closing said switch contacts only during occurrence of said last-mentioned ringing voltages.

2. A telephone ringer isolation circuit for each subscriber ringer associated with respective tip and ring wires of a two-wire telephone line for use in multi-party telephone system having varying combinations of ringing voltages and frequencies with and without direct current potentials of either polarity to preserve electrical line balance between said wires during talking periods and responsive only to alternating current ringing voltages for activating any of a set of ringers associated with a respective one of said wires to connect said set of ringers to said one of said wires during occurrence of said ringing voltages, said circuit comprising a first series circuit including a normally non-conducting two-electrode gas tube and an inductance coil coupled between the one of said wires by which the associated ringer is activated and ground, a second series circuit electrically paralleling said first series circuit coupled between said one of said wires and ground including the associated ringer and a vibratory reed magnetic switch disposed in the magnetic field of said inductance coil having contacts responsive to magnetic flux generated by said coil to close upon application of said alternating current ringing voltages to said first series circuit, said gas tube responding to said ringing voltages on the associated one of said wires to conduct current therefrom through said coil for closing said switch contacts only during occurrence of said last mentioned ringing voltages.

3. A telephone ringer isolation circuit as defined in claim 2, wherein said inductance coil and magnetic switch are responsive to ringing voltage frequencies in the range of 16 to 66 c.p.s. to close said contacts.

4. A telephone ringer isolation circuit as defined in claim 2, wherein said first series circuit includes a capacitor in series with said coil, said capacitor and coil being series resonant at about 20 c.p.s.

5. A telephone ringer isolation circuit as defined in claim 2, wherein said magnetic switch has a finite selected delay in circuit closure of sufficient length to prevent switch closure from momentary lightning induced surge voltages and the like.

6. In a telephone ringer isolation circuit as defined in claim 2, said gas tube having an internal voltage drop of about 65 volts.

References Cited by the Examiner

UNITED STATES PATENTS

| | | | |
|---|---|---|---|
| 2,532,125 | 11/1950 | Singer et al. | 179—87 |
| 2,824,174 | 2/1958 | Holman | 179—17 X |
| 2,824,175 | 2/1958 | Meacham et al. | 179—86 |
| 2,863,952 | 12/1958 | Scrowcroft et al. | 179—86 |
| 3,026,377 | 3/1962 | Sullivan | 179—87 |

ROBERT H. ROSE, *Primary Examiner.*

WALTER L. LYNDE, *Examiner.*

H. BOOHER, H. ZELLER, *Assistant Examiners.*